July 17, 1962 H. M. GEYER 3,044,785
ACTUATOR SEAL ASSEMBLY
Filed April 20, 1959

INVENTOR.
Howard M. Geyer
BY
*W. E. Finken*
His Attorney

United States Patent Office 3,044,785
Patented July 17, 1962

3,044,785
ACTUATOR SEAL ASSEMBLY
Howard M. Geyer, Dayton, Ohio, assignor to General Motors Corporation, Detroit, Mich., a corporation of Delaware
Filed Apr. 20, 1959, Ser. No. 807,396
2 Claims. (Cl. 277—59)

This invention pertains to hydraulic actuators, and particularly to a replacement rod ring orifice assembly for hydraulic actuators that are subjected to relatively high ambient temperatures.

Prior to the development of high temperature hydraulic actuators which embody oil circulation means such as shown in my copending application Serial No. 648,361, filed March 25, 1957, now Patent Number 2,953,119, hydraulic actuators were not designed for use in installations where the ambient temperature exceeded approximately 500° F. However, numerous actuators of the type shown in my Patent 2,657,539 were manufactured for use on military aircraft, and in some aircraft installations these actuators were subjected to ambient temperatures in excess of 500° F. Since the actuators were not designed for use in high ambient temperatures, the rod end seals, which were of the rubber O-ring type, failed by burning out due to lack of lubrication. The present invention relates to a replacement high pressure rod ring orifice assembly for low temperature hydraulic actuators which enables these actuators to be used in installations where they are subjected to high ambient temperatures in excess of 500° F. Accordingly, among my objects are the provision of a replacement rod ring orifice assembly for hydraulic actuators; the further provision of a replacement rod ring orifice assembly adapted to fit an O-ring groove; and the still further provision of a rod ring orifice assembly for an actuator which permits a metered flow of oil thereacross and constitutes a self-cleaning orifice.

The aforementioned and other objects are accomplished in the present invention by replacing the high pressure O-ring assembly with a multi-part rod ring orifice assembly adapted to fit within the O-ring groove. Specifically, the low temperature hydraulic actuators previously manufactured in accordance with my aforementioned patent comprise a cylinder having a reciprocable piston therein. The piston includes a rod portion which extends outside of one end of the cylinder, the piston carrying a nut which threadedly engages a screw shaft rotatably journalled in the cylinder such that piston reciprocation is dependent upon and effects rotation of the screw shaft. In order to synchronize the operation of a plurality of adjacent actuators, the screw shafts of the adjacent actuators are interconnected by suitable torque transmitting means, such as a flexible cable.

The rod end of the cylinder is closed by a tubular cap within which the piston rod is slidably supported. Thus, the rod end cap includes a hollow guide bushing having an external annular groove connecting with one of the actuator chambers and ports for supplying and draining hydraulic fluid to and from the actuator chamber. The rod end cap is formed with a pair of spaced, internal O-ring grooves and a drain groove located between the O-ring grooves. The drain groove connects with a drain port that is connected to a drain conduit.

The provision of a drain port and drain conduit was required by the military specifications to prevent the leakage of oil along the rod in case the high pressure O-ring seal failed. However, since the drain conduit is normally connected to the reservoir of hydraulic fluid, the hydraulic fluid in the drain conduit tended to congeal when subjected to high ambient temperatures. Furthermore, since the low pressure O-ring seal was not lubricated, it usually failed prior to failure of the high pressure seal due to lack of lubrication.

Accordingly, in the present invention, the high pressure O-ring seal assembly including a pair of back plates and a rubber O-ring seal, is replaced by a rod ring seal assembly comprising a four-part metallic retainer having an annular groove at one end adapted to receive a metallic seal ring assembly comprising an inner split orifice ring and an outer split pressure ring for maintaining the orifice ring in resilient engagement with the piston rod. The orifice ring permits a metered flow of hydraulic fluid from the rod end actuator chamber due to a pressure differential thereacross, and thus constitutes a self-cleaning orifice since the piston rod is movable relative thereto. The hydraulic fluid which circulates past the orifice ring lubricates the low pressure O-ring seal assembly and flows back to the reservoir through the drain conduit. Accordingly, hydraulic fluid is continuously circulated through the drain conduit thereby preventing congealing of hydraulic fluid therein. In this manner the actuators retrofitted with the rod ring orifice assembly of this invention can be used in installations where they are subjected to high ambient temperatures in excess of 500° F.

Further objects and advantages of the present invention will be apparent from the following description, reference being had to the accompanying drawings, wherein a preferred embodiment of the present invention is clearly shown and wherein like numerals depict the parts throughout the several views.

Figure 1:
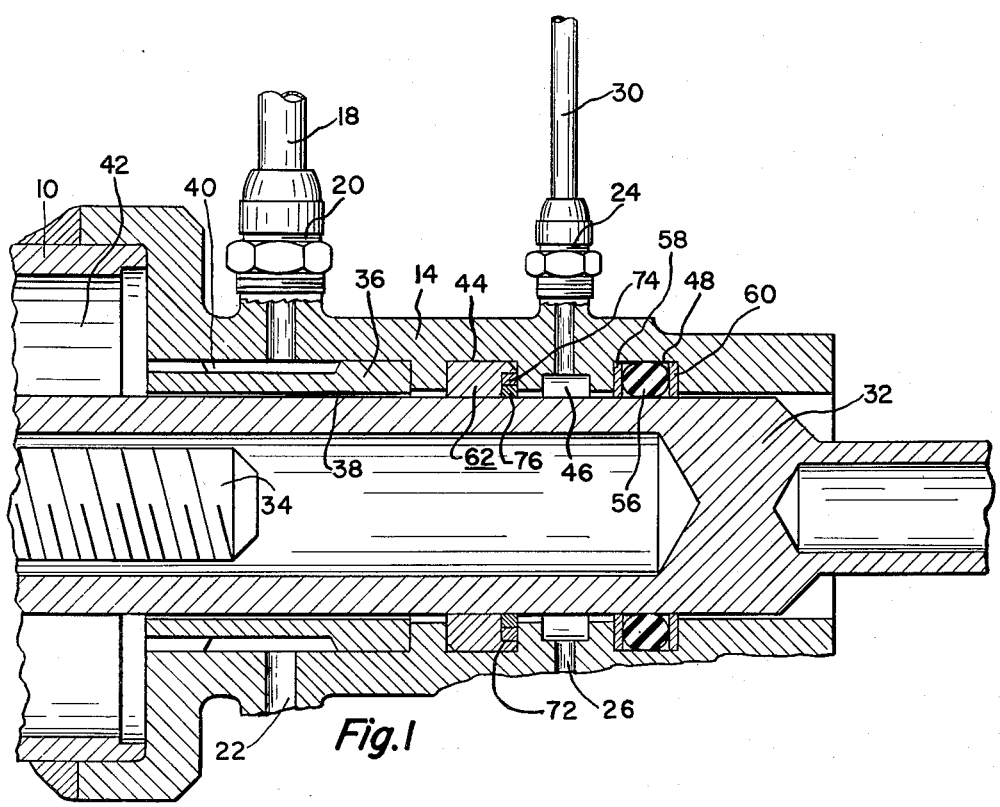
FIGURE 1 is an enlarged fragmentary sectional view of a low temperature actuator which has been retrofitted with the rod ring orifice assembly of this invention.
Figure 2:
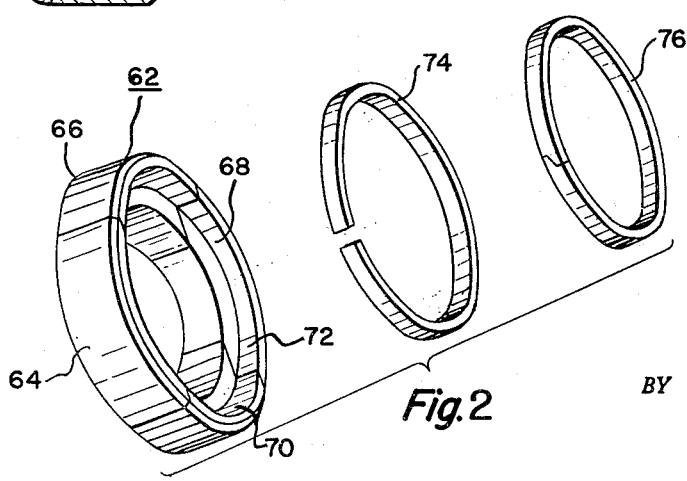
FIGURE 2 is an exploded view, in perspective, of the rod ring orifice assembly embodied in the actuator shown in FIGURE 3.

With particular reference to FIGURES 1 and 2, an actuator is shown including a cylinder 10 having a tail cap 14 welded thereto. The rod end cap 14 has a pair of diametrically opposed retract port assemblies 20 and 22 which can be connected with conduits that interconnect the rod end chambers of adjacent actuators. The rod end cap 14 also carries a pair of diametrically opposed drain port assemblies 24 and 26, and the drain port assemblies of adjacent actuators are likewise interconnected by conduits that communicate with the reservoir of hydraulic fluid, not shown.

As seen particularly in FIGURE 1, the retract port assembly 20 is connected to a conduit 18, and the drain port assembly 24 is connected to a conduit 30. The piston, not shown, includes an axially extending rod 32 which extends through the tubular tail cap 14. The piston rod 32 is hollow and a screw shaft 34, rotatably mounted in the cylinder and operatively connected to the piston, extends into the hollow piston rod. The piston rod 32 is slidably supported within the tail cap 14 by a guide bushing 36 which has an inner diameter greater than the outer diameter of the piston rod 32 so as to form an annular space 38 therebetween. The guide bushing 36 is formed with an external annular groove 40 that communicates with the port assembly 20 as well as the port assembly 22. The annular groove 40 communicates with the rod end actuator chamber 42 whereby hydraulic fluid can be supplied and drained therefrom.

The rod end cap 14 is formed with three spaced internal annular grooves 44, 46 and 48 which are interconnected by the annular space between the inner diameter of the tubular tail cap and the outer diameter of the piston rod. The drain port assemblies 24 and 26 communicate with the annular groove 46. The annular groove 48 receives a low pressure O-ring seal assembly comprising an O-ring 56 and a pair of backing plates 58 and 60.

With reference to FIGURES 1 and 2, in order to convert a low temperature actuator to a high temperature circulating actuator, the groove 44 receives a rod ring orifice assembly such as shown in FIGURE 2. The rod ring orifice assembly comprises a multi-part steel retainer 62 comprising arcuate sections 64, 66, 68 and 70 having chamfered outer edges. The arcuate sections 64 and 68 are of identical construction as are the arcuate sections 66 and 70. The arcuate sections are formed by cutting the retainers in parallel planes which are spaced apart a distance slightly less than the inner diameter of the retainer. The sections 64 and 68 have internal arcuate grooves adjacent one edge, as do the sections 66 and 70, so that when assembled the retainer 62 has an internal annular groove 72. The axial width of the retainer 62 corresponds to the axial width of the groove 44 in the tail cap. An outer split pressure ring 74 and an inner split orifice ring 76 are adapted for assembly within the annular groove 72. The cast iron rings 74 and 76 have the same nominal outer diameter, which is smaller than the diameter of the groove 72 and larger than the inner diameter of the retainer 62. The ring 74 is expanded over the outer periphery of the orifice ring 76 and thus tends to resiliently maintain the piston ring 76 in the closed position. When the split pressure ring 74 is expanded over the unitary split orifice ring 76, the resultant assembly is snugly received within the annular groove 72 of the retainer 62 such that the outer diameter of the pressure ring 74 in its expanded condition is substantially equal to the diameter of the groove 72, as seen in FIGURE 1.

To retrofit a low temperature actuator with the rod ring orifice assembly, the head cap of the actuator is removed from the cylinder to permit withdrawal of the piston and rod 32. The original high pressure O-ring seal including an O-ring and the backing rings are removed from the groove 44, and the multi-part retainer 62 is assembled within the groove 44. The sections 64, 66, 68 and 70 of the multi-part retainer 62 can be readily assembled within the groove 44 since the ends of the sections 64, 66, 68 and 70 lie in spaced parallel planes. Thereafter, the outer pressure ring 74 is snapped into the groove 72 after which the orifice ring 76 is assembled therewith. Since the guide bushing 36 permits the flow of hydraulic fluid from the rod end chamber 42 through the annular space 38, and since the orifice ring 76 permits a metered amount of fluid to flow from one side thereof to the other, whenever there is a pressure differential between the rod end chamber 42 and the drain groove 46, a metered amount of hydraulic fluid will circulate from the rod end chamber 42 past the sealing ring 76 and into the drain groove 46. This hydraulic fluid will lubricate the low pressure O-ring seal 56 so as to prevent burn out thereof. In addition, this metered hydraulic fluid will circulate through the drain tube 30 back to the reservoir and prevent congealing of hydraulic fluid in the drain conduit due to the high ambient temperature.

From the foregoing it is manifest that the present invention enables the use of low temperature hydraulic actuators in high ambient temperature installations by permitting a metered circulation of hydraulic fluid from the rod end chamber into the drain conduit. In addition, the present invention lubricates the low pressure O-ring seal assembly thereby preventing failure thereof due to burn out at high ambient temperatures.

While the embodiment of the invention as herein disclosed constitutes a preferred form, it is to be understood that other forms might be adopted.

What is claimed is as follows:

1. A seal assembly for a hydraulic actuator having a cylinder with a reciprocable rod extending therefrom including, a tubular member attached to the rod end of said cylinder, said tubular member having a pair of spaced internal annular grooves, a rod ring orifice assembly disposed within the inner of said grooves comprising an annular retainer formed by a plurality of arcuate sections, a unitary split pressure ring within said retainer and an orifice ring within said pressure ring, said orifice ring resiliently engaging said rod and forming a self-cleaning orifice between the rod and the ring, an O-ring seal assembly disposed within the outer groove of said tubular member, and a drain passage between said rod ring orifice assembly and said O-ring seal assembly whereby hydraulic fluid flowing through said orifice due to a pressure differential across said orifice ring will lubricate said O-ring seal assembly and flow through said drain passage.

2. The seal assembly set forth in claim 1 wherein said retainer comprises four arcuate sections which are formed by cuts through said retainer in spaced parallel planes.

References Cited in the file of this patent

UNITED STATES PATENTS

| | | |
|---|---|---|
| 873,507 | Cook | Dec. 10, 1907 |
| 925,459 | Cook | June 22, 1909 |
| 980,282 | Junggren | Jan. 3, 1911 |
| 1,424,655 | Kurtz | Aug. 1, 1922 |
| 1,879,855 | Morton | Sept. 27, 1932 |
| 1,927,507 | Sommers et al. | Sept. 19, 1933 |
| 2,208,976 | Halfpenny | July 23, 1940 |
| 2,849,244 | Sampson | Aug. 26, 1958 |
| 2,877,071 | Arnot | Mar. 10, 1959 |
| 2,888,286 | Scheffler | May 26, 1959 |